United States Patent
Yeh

(10) Patent No.: US 7,447,930 B2
(45) Date of Patent: Nov. 4, 2008

(54) USB CONTROL CIRCUIT FOR SAVING POWER AND THE METHOD THEREOF

(75) Inventor: Yu-Fu Yeh, Taipei (TW)

(73) Assignee: Via Technologies, Inc., Taiepi (TW)

( * ) Notice: Subject to any disclaimer, the term of this patent is extended or adjusted under 35 U.S.C. 154(b) by 495 days.

(21) Appl. No.: 11/220,554

(22) Filed: Sep. 8, 2005

(65) Prior Publication Data

US 2006/0090026 A1    Apr. 27, 2006

Related U.S. Application Data

(60) Provisional application No. 60/621,653, filed on Oct. 26, 2004.

(51) Int. Cl.
*G06F 1/00*    (2006.01)

(52) U.S. Cl. ............... 713/324; 713/300; 713/310; 713/321; 713/322; 713/323; 713/330; 713/340

(58) Field of Classification Search ............ 713/300, 713/310, 320–324, 330, 340
See application file for complete search history.

(56) References Cited

U.S. PATENT DOCUMENTS

| | | | |
|---|---|---|---|
| 6,460,143 B1 * | 10/2002 | Howard et al. | 713/323 |
| 6,615,301 B1 * | 9/2003 | Lee et al. | 710/106 |
| 6,681,334 B2 * | 1/2004 | Nakamura | 713/300 |
| 6,708,278 B2 * | 3/2004 | Howard et al. | 713/323 |
| 7,320,077 B2 * | 1/2008 | Kim | 713/300 |

* cited by examiner

*Primary Examiner*—Abdelmoniem Elamin
(74) *Attorney, Agent, or Firm*—Thomas, Kayden, Horstemeyer & Risley

(57) ABSTRACT

A USB control circuit for saving power and the method thereof employs a first logic circuit to generate a control signal that turns on the power of a transmitting module, so as to enable the transmitting module just before sending data. The above-mentioned USB control circuit and the method thereof also employs a second logic circuit to select the control signal, so as to solve the problem in USB handshaking processes and to provide a selection for changing the control signal.

20 Claims, 7 Drawing Sheets

USB CONTROL CIRCUIT FOR SAVING POWER AND THE METHOD THEREOF

This application claims benefit of application Ser. No. 60/621,653 filed Oct. 26, 2004.

BACKGROUND OF THE INVENTION

1. Field of the Invention

This invention generally relates to a control circuit and the method thereof, and more particularly, to a universal serial bus (USB, thereinafter called USB) control circuit and the method thereof that saves power.

2. Description of the Prior Art

FIG. 1 shows a connection of a control signal of a well-known USB control circuit. A control signal PdHsDRV is equal to the other control signal PdHsPort since both their physical lines are connected together. Wherein, the control signal PdHsPort is utilized to enable a USB device to keep working in high-speed actions while the USB device operates in high-speed mode (those skilled in the art also call "USB 2.0 mode"), and the control signal PdHsDRV is used to control the power of the transmitting module in the USB device. Accordingly, the power of the transmitting module in the USB device is always turned on as the USB device operates in high-speed mode.

However, in USB operation processes, the USB device may be in an idle status or may in a receiving status, and still, receiving and transmitting cannot be simultaneously performed in the same USB device. Therefore, it is not necessary to provide the power to the transmitting module when the USB device is idle or even is receiving data from another USB device. Also, from another aspect, as the USB device operates in high-speed mode whether is idle or is receiving data from another USB device, it bypasses a current (so-called leakage current) about 18 mA per second to the ground because the power of the transmitting module is still provided. This situation causes not only the leakage current but also a heating effect caused by the leakage current, and further, consumes the power of the USB device.

Taking a USB device, such as a portable USB digital camera that installs four batteries (double A, 1.5V, 1500 mAh) as its power source, as an example for further explanation, the USB device extra consumes over 1% power and further generates a heating effect about 59.4 mW (3.3V*18 mA=59.4 mW) per second while it is idle or it is receiving data from another USB device, such as a USB host, in high-speed mode. Herein, 3.3V represents the power voltage of the USB device. In other words, the power of the portable USB digital camera is consumed quite fast when the portable USB digital camera operates in high-speed mode but in an idle status or in a receiving status. However, the power for those portable USB devices (not only for USB digital cameras) is an important operation issue and should not be consumed too much in USB operations.

In view of the drawbacks mentioned with the USB control circuit in the prior art, there is a continued need to develop a new and improved control circuit and the method thereof that overcomes the disadvantages associated with the USB control circuit in the prior art. The advantages of this invention are that it solves the problems mentioned above.

SUMMARY OF THE INVENTION

In accordance with the present invention, a USB control circuit and the method thereof for saving power substantially obviates one or more of the problems resulted from the limitations and disadvantages of the prior art mentioned in the background.

The present invention provides a first logic circuit to generate a control signal that replaces an original control signal to turn on the power of a transmitting module in a USB device, so as to enable the transmitting module in the USB device just before the transmitting module transmits data.

The present invention provides a second logic circuit to select one of control signals that enable the power of the transmitting module in the USB device, so as to solve the problem in handshaking processes and provide a selection for changing the control signals.

The present invention provides a USB control method for saving power, so as to control the time for turning on the power of the transmitting module in a USB device, and to solve the problem occurring in a handshaking process, and to provide a selection for changing control signals.

In accordance with the present invention, a USB control circuit for saving power is disclosed. The USB control circuit includes a first logic circuit and a second logic circuit. The first logic circuit receives a first signal, a second signal, and a third signal, and generates a control signal that turns on the power of a transmitting module before the transmitting module transmits data. Wherein, the first signal and the second signal are individually previous stage signals of the third signal, and the third signal is used to enable the transmitting module to transmit data. The second logic circuit receives the control signal, a fourth signal, and a fifth signal to perform a handshaking process, and provides a selection for changing control signals. Wherein, the fourth signal is an original control signal that turns on the power of the transmitting module, and the fifth signal is used to select one of the control signal and the fourth signal.

The present invention further discloses a USB control method for saving power. The USB control method for saving power includes receiving a first signal, a second signal, and a third signal, wherein the first signal and the second signal are individually previous stage signals of the third signal, and the third signal is used to enable a transmitting module to transmit data; generating a control signal, the control signal turning on the power of the transmitting module prior to the transmitting module transmitting data; receiving the control signal, a fourth signal, and a fifth signal, wherein the fourth signal is an original control signal that indicates whether to activate the transmitting module; and utilizing the fifth signal to select one of the control signal and the fourth signal, so as to control the time for turning on the power of the transmitting module, and to solve the problem occurring in a handshaking process, and to provide a selection for changing control signals.

BREIF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Some embodiments of the invention will now be described in greater detail. However, it should be noted that the present invention can be practiced in a wide range of other embodiments besides those explicitly described, and the scope of the present invention is expressly not limited except as specified in the accompanying claims. Moreover, some irrelevant details are not drawn in order to make the illustrations concise and to provide a clear description for easily understanding the present invention.

Figure 1:
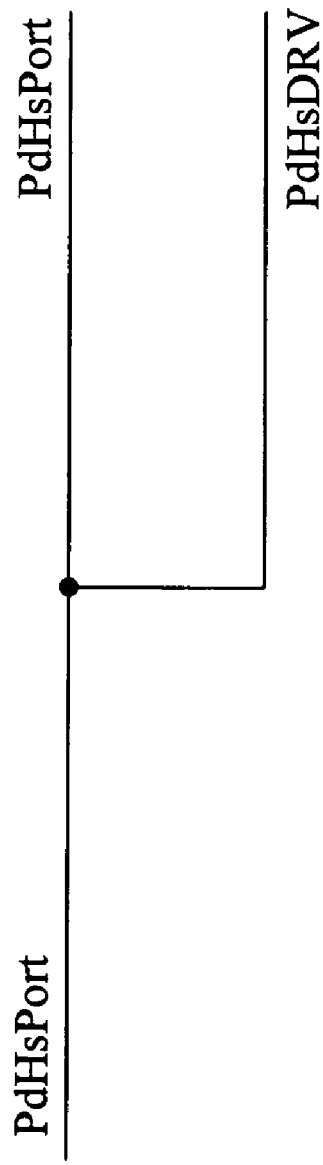
FIG. 1 illustrates a connection of a control signal of a well-known USB control circuit.
Figure 2A:
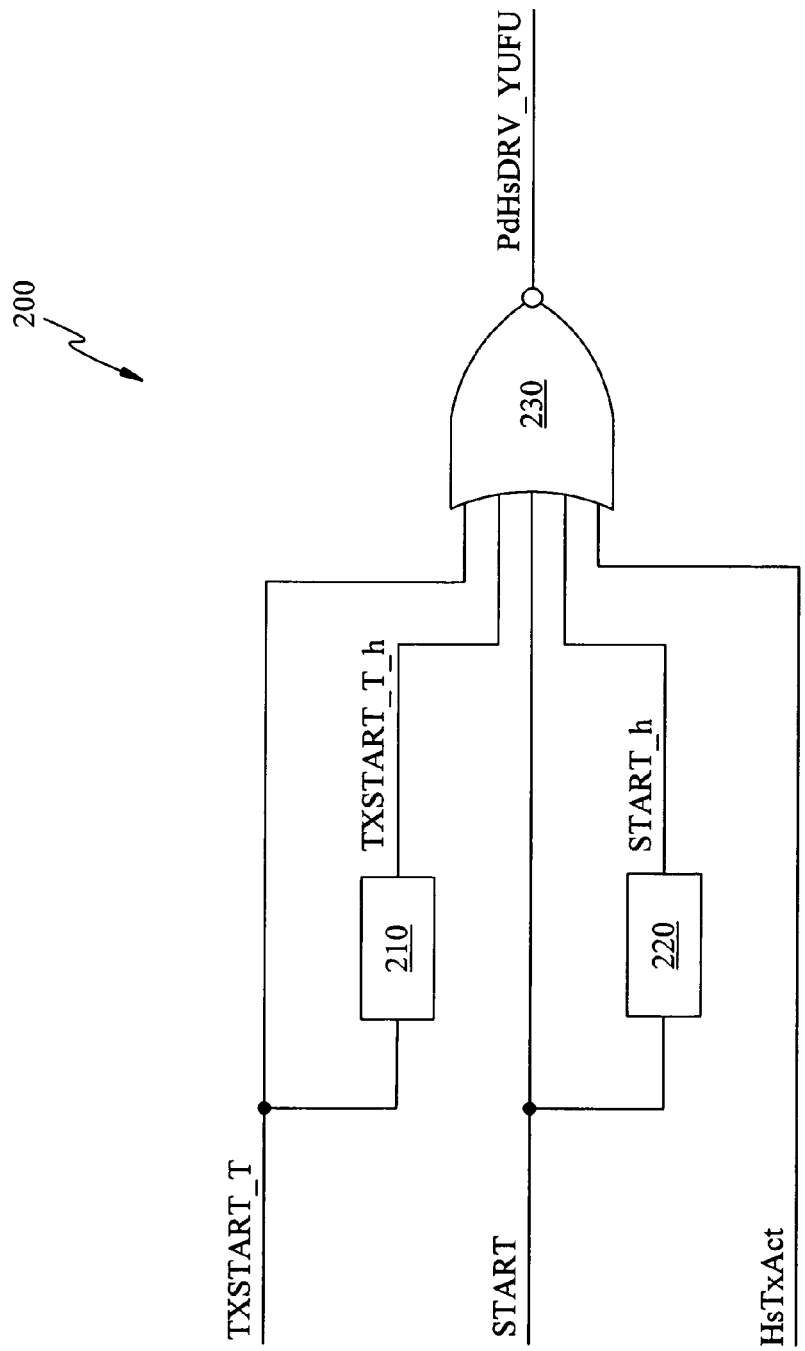
FIG. 2A illustrates one preferred embodiment for generating a control signal in accordance with the present invention.

Referring to FIG. 2A, a preferred embodiment for generating a control signal in accordance with the present invention is illustrated. A first logic circuit 200 receives a first signal TXSTART_T, a second signal START, and a third signal HsTxAct, and generates a control signal PdHsDRV_YUFU. Wherein, the control signal PdHsDRV_YUFU is utilized to indicate whether to activate the transmitting module in a USB device (not shown), the third signal HsTxAct is utilized to indicate the transmitting module in the USB device whether to transmit data. The first signal TXSTART_T and the second signal START are the previous two-stage and the previous stage signals of the third signal HsTxAct, respectively. However, it should be understood that the first signal and the second signal should not be respectively limited to the previous two-stage and the previous stage signals of the third signal, and both of them are all previous stage signals of the third signal, individually. As for the previous stage signal in the present invention, it means the input signal of a first logic part to the input signal of a second logic part whose input electronically connects to the output of the first logic part; likewise, the previous two-stage signal means the input signal of the first logic part to the input signal of a third logic part, herein the output of the first logic part electronically connects to the input of the second logic part, and the output of the second logic part electronically connects to the input of the third logic part.

The first logic circuit 200 has a NOR gate 230 that receives the above-mentioned signals including TXSTART_T, START, and HsTxAct to generate the control signal PdHsDRV_YUFU. Consequently, the control signal PdHsDRV_YUFU is active low when any one of the signals TXSTART_T, START, and HsTxAct is active high. Because the control signal PdHsDRV_YUFU can be enabled by the first signal TXSTART_T (the previous two-stage signal of the third signal HsTxAct) or the second signal START (the previous stage signal of the third signal HsTxAct) through the logic operation of the NOR gate 230, the control signal PdHsDRV_YUFU is active earlier than the third signal HsTxAct. This means, the power of the transmitting module in the USB device can be provided just before the transmitting module transmits data, so as to solve the leakage current problem and save power during the transmitting module being inactive or the USB device just receiving data from another USB device in high-speed mode. It should be understood, however, the function of the NOR gate 230 are implemented through various circuits and logic combinations, and it should not be limited in the present embodiment.

The first logic circuit 200 also has two sub-circuits 210 and 220. The sub-circuits 210 and 220 are respectively used to shift the phases of the first signal TXSTART_T and the second signal START, and generate a first sub-signal TXSTART_T_h and a second sub-signal START_h, respectively. The NOR gate 230 receives the sub-signals TXSTART_T_h and START_h to eliminate the signal gaps between the first signal TXSTART_T and the second signal START, and between the second signal START and the third signal HsTxAct during the logic operation of the NOR gate 230 to avoid malfunctions. In the present embodiment, the first sub-signal TXSTART_T_h delays half a system clock compared to the first signal TXSTART_T, and likewise, the second sub-signal START_h delays half a system clock compared to the second signal START as well.

Figure 2B:
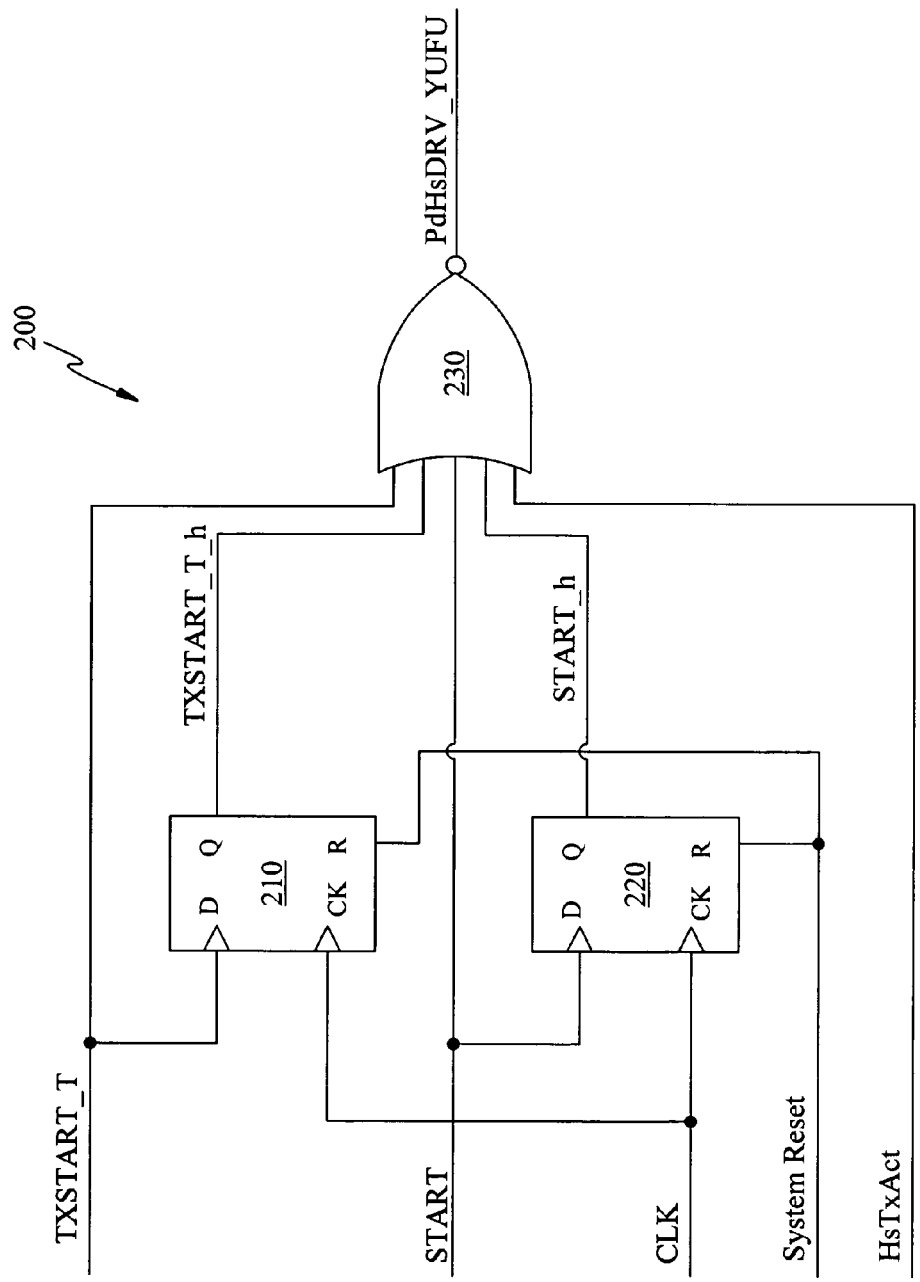
FIG. 2B illustrates another preferred circuit of FIG. 2A.

Referring to FIG. 2B, a preferred embodiment circuit of FIG. 2A is illustrated. The differences between FIG. 2B and FIG. 2A are that two D type flip-flops 210 and 220 in FIG. 2B replace the sub-circuits 210 and 220 in FIG. 2A. The D type flip-flops 210 and 220 respectively receive and latch the first signal TXSTART_T and the second signal START after receiving a clock CLK, and output the first sub-signal TXSTART_T_h and the second sub-signal START_h after receiving the subsequent clock CLK. A signal System Reset is utilized to reset the two D type flip-flops 210 and 220. In the present embodiment, the frequency of the clock CLK is the same as the frequency of the system clock but half a cycle lag to the system clock. As for the signals TXSTART_T, START, HsTxAct, PdHsDRV_YUFU, TXSTART_T_h, START_h, and the NOR gate 230, they are the same as those described in FIG. 2A. However, it should be understood that the first sub-signal TXSTART_T_h and the second sub-signal START_h are generated by any other logic circuit, not limited to the D type flip-flop.

On the other hand, however, since an original control signal that indicates whether to activate the transmitting module in the USB device is replaced with the control signal PdHsDRV_YUFU generated by the present embodiment, a chirp-K signal cannot be transmitted to another connected USB device, such as a USB hub or a USB host, during a handshaking process. This is because there is no signal HsTxAct when the USB device just connects to another USB device. This status results in a handshaking mistake and makes the USB device only work in full-speed mode or low-speed mode even if it can work in high-speed mode. Herein, the chirp-K signal is used to inform other USB devices that this USB device can operates in high-speed mode. More detail discussion associated with USB handshaking can be found on the www.usb.org web site or can refer to "Universal Serial Bus Specification Revision 2.0 Apr. 27, 2000" announced by the USB organization.

Figure 3A:
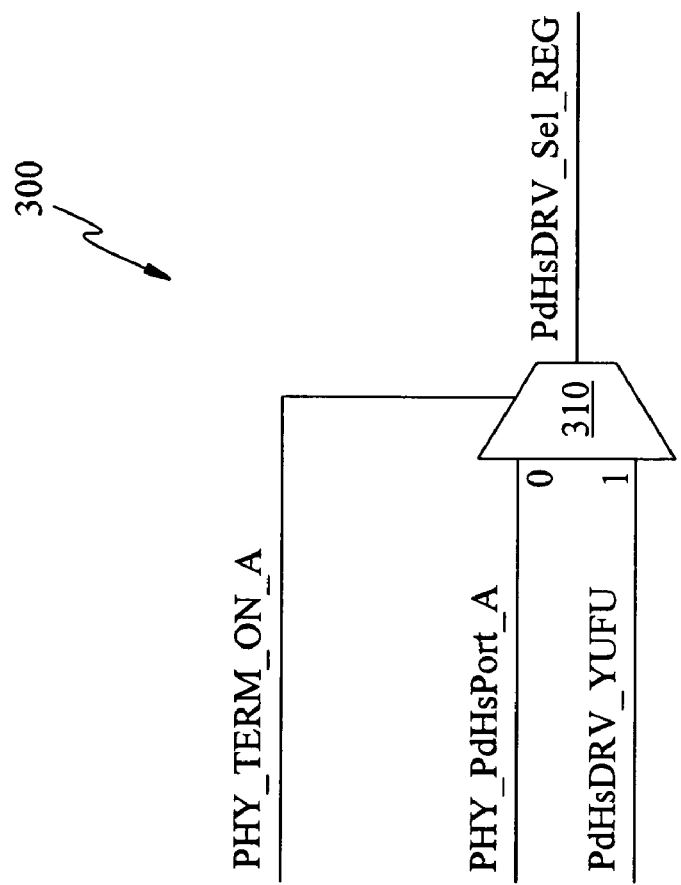
FIG. 3A illustrates one preferred embodiment for selecting the control signal in accordance with the present invention.

Referring to FIG. 3A, a preferred embodiment for selecting the control signal in accordance with the present invention is illustrated. A second logic circuit 300 receives the control signal PdHsDRV_YUFU, a fourth signal PHY_PdHsPort_A, and a fifth signal PHY_TERM_ON_A, and generates a sixth signal PdHsDRV_Sel_REG. Wherein, the control signal PdHsDRV_YUFU is a signal that is generated and utilized to indicate whether to activate the transmitting module in the present embodiment, the fourth signal PHY_PdHsPort_A is an original control signal that indicates whether to activate the transmitting module, and the fifth signal PHY_TERM_ON_A is a signal that indicates a handshaking process being finished.

The second logic circuit 300 includes a multiplexer 310. The multiplexer 310 receives the above-mentioned signals PdHsDRV_YUFU and PHY_PdHsPort_A as its data inputs, and receives the fifth signal PHY_TERM_ON_A as its switch control. Accordingly, the output of the multiplexer 310 (the sixth signal PdHsDRV_Sel_REG) could be either the fourth signal PHY_PdHsPort_A (the original control signal) or the control signal PdHsDRV_YUFU through the fifth signal PHY_TERM_ON_A selection. For example, while the fifth signal PHY_TERM_ON_A is logic "0", the fourth signal PHY_PdHsPort_A is selected by the multiplexer 310 as the sixth signal PdHsDRV_Sel_REG. While the fifth signal PHY_TERM_ON_A is logic "1", the control signal PdHsDRV_YUFU is selected by the multiplexer 310 as the sixth signal PdHsDRV_Sel_REG. In other words, the second logic circuit 300 utilizes the original control signal PHY_PdHsPort_A to indicate whether to activate the transmitting module during a handshaking process, but uses the control signal PdHsDRV_YUFU to indicate whether to activate the transmitting module after the handshaking process. By doing so, the chirp-K signal during the handshaking process for high-speed mode can be transmitted in the present invention. However, it should be understood that the fifth signal PHY_TERM_ON_A should not be limited to indicate the finish of a handshaking process. It could also be designed to indicate other events upon the particular needs of the user.

Figure 3B:
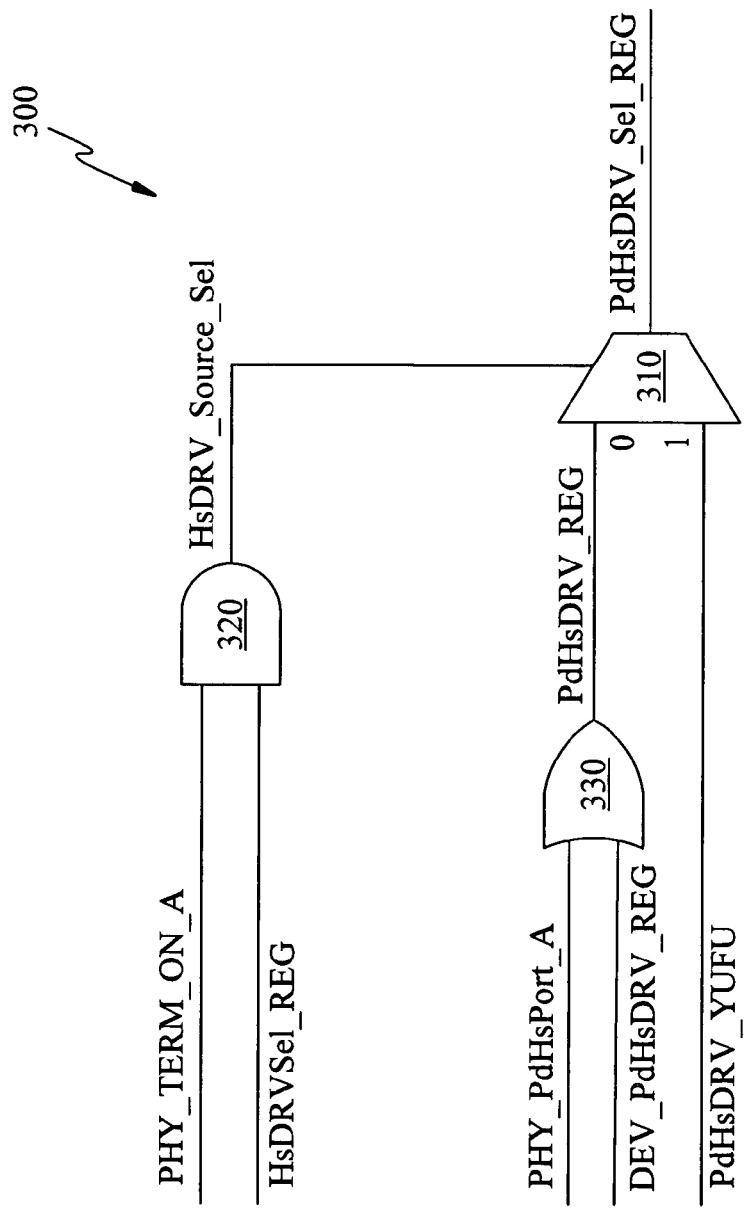
FIG. 3B illustrates another preferred embodiment for selecting the control signal in accordance with the present invention.

Referring to FIG. 3B, another embodiment for selecting the control signal in accordance with the present invention is illustrated. The differences between FIG. 3B and FIG. 3A are that an OR gate 330 is used to receive the fourth signal PHY_PdHsPort_A and a seventh signal DEV_PdHsDRV_REG to generate an input signal PdHsDRV_REG of the multiplexer 310, and that an AND gate 320 is used to receive the fifth signal PHY_TERM_ON_A and a eighth signal HsDRVSel_REG to generate a selection signal HsDRV_Source_Sel of the multiplexer 310. Wherein, the seventh signal DEV_PdHsDRV_REG and the eighth signal HsDRVSel_REG are respectively employed to set the operation mode and the control signal for the USB device. For example, when the seventh signal DEV_PdHsDRV_REG is set to logic "1", the input signal PdHsDRV_REG of the multiplexer 310 always keeps logic "1" after the logic operation of the OR gate 330. This means, the USB device can not indicate whether to activate the transmitting module for sending the chirp-K signal during the handshaking process for high-speed mode. In other words, the high-speed mode of the USB device is disabled. However, the seventh signal DEV_PdHsDRV_REG is initially set to logic "0". Another example, the selection signal HsDRV_Source_Sel of the multiplexer 310 always keeps logic "0" after the logic operation of the AND gate 320 when the eighth signal HsDRVSel_REG is set to logic "0". That is, the multiplexer 310 selects the input signal PdHsDRV_REG as the sixth signal PdHsDRV_Sel_REG to turn on the power of the transmitting module in the USB device. In other words, the USB device uses the original control signal to indicate whether to activate the transmitting module. However, the eighth signal HsDRVSel_REG is initially set to logic "1", so that the control signal PdHsDRV_YUFU can be selected as the signal PdHsDRV_Sel_REG through the multiplexer 310 after the handshaking process for high-speed mode is finished. As to the control signal PdHsDRV_YUFU, the fourth signal PHY_PdHsPort_A, and the fifth signal PHY_TERM_ON_A are the same as those described in FIG. 3A. However, it should be understood that the second logic circuit 300 can be implemented through other logic circuits, not limited to those described in FIG. 3A and FIG. 3B.

Figure 4:
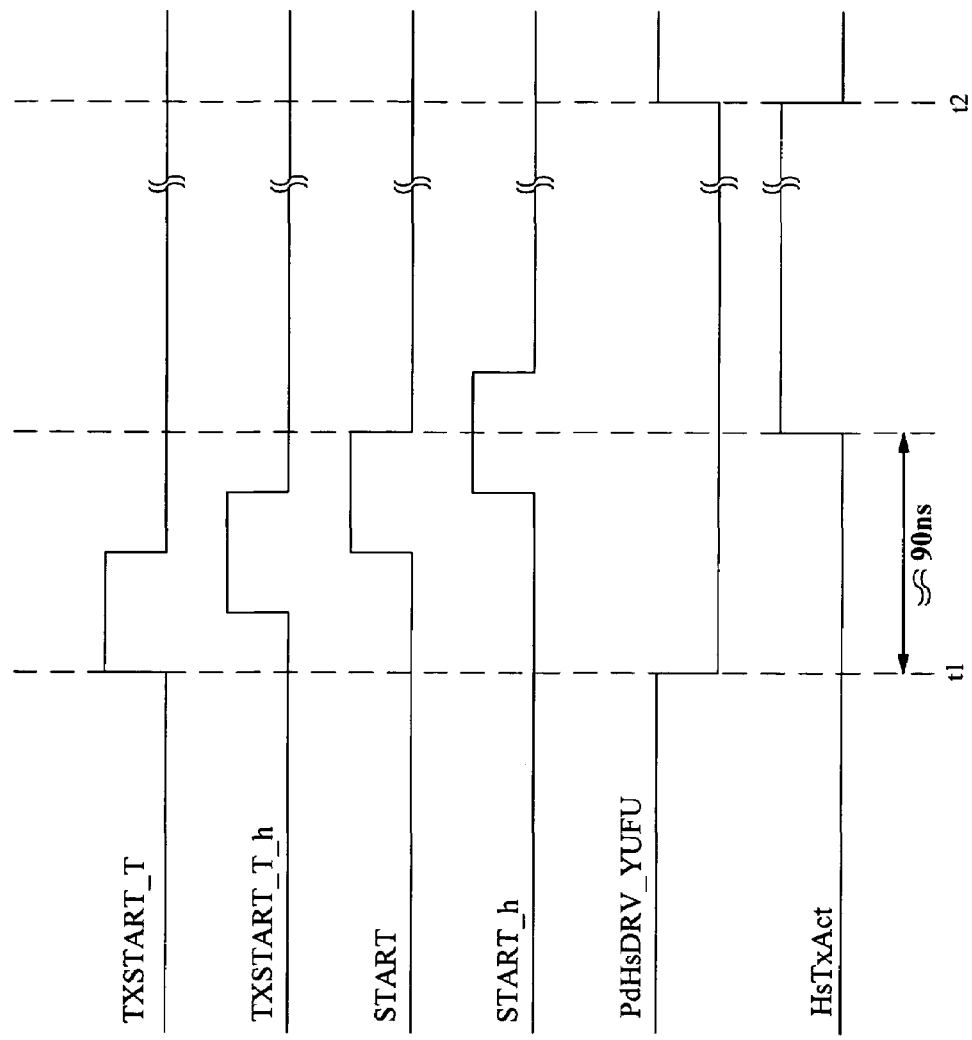
FIG. 4 shows signal-waveforms of one preferred embodiment illustrated in FIG. 2A in accordance with the present invention.

Referring to FIG. 4, signal-waveforms of the preferred embodiment illustrated in FIG. 2A in accordance with the present invention are shown. However, in order to have a concise illustration for showing the relations among the signal-waveforms in FIG. 4, each vertical axis that indicates the voltage unit, such as millivolt (mV), for corresponding signal-waveform is not illustrated, and the horizontal direction in FIG. 4 is directly used for representing time. Also, it should be understood that the signal-waveforms in FIG. 4 conform to USB standard, and hence, FIG. 4 is used for describing the relations among the control signal, the operation mode, and the power-on and power-off for the transmitting module in accordance with the present embodiment. The signal TXSTART_T and the signal START are previous stage signals of the signal HsTxAct (the previous two-stage signal and the previous stage signal, individually). Moreover, the signals TXSTART_T_h and START_h respectively lag half a system clock to the signals TXSTART_T and START. In time t1, the signal PdHsDRV_YUFU is active low when the signal TXSTART_T starts active high. Then, the signal PdHsDRV_YUFU keeps active low since the signals TXSTART_T_h, START, START_h, and HsTxAct are subsequently active until the signal HsTxAct is inactive (in time t2). That is, the power of the transmitting module in a USB device is turned on by the signal PdHsDRV_YUFU before the transmitting module in the USB device is enabled by the signal HsTxAct to transmit data. In the meanwhile, the power of the transmitting module is still provided until the transmitting module is disabled by the signal HsTxAct. In other words, the power of the transmitting module is turned off after the data transmission is finished. In this embodiment, the time between beginning the power of the transmitting module and starting to transmit data prefers at least about 90 nanoseconds, so that the transmitting module has an enough time to arise current to over 17.78 mA to meet the needs of the working current of the USB high-speed mode, and further to arise voltage from zero to the working voltage level. However, the above-mentioned "at least about 90 nanoseconds" is adjustable according to the real reaction time of the circuit. For example, if the transmitting module can pull up current to over 17.78 mA in 50 nanoseconds, the "at least about 90 nanoseconds" can be adjusted to "at least about 50 nanoseconds" to meet the particular needs of the user.

Figure 5:
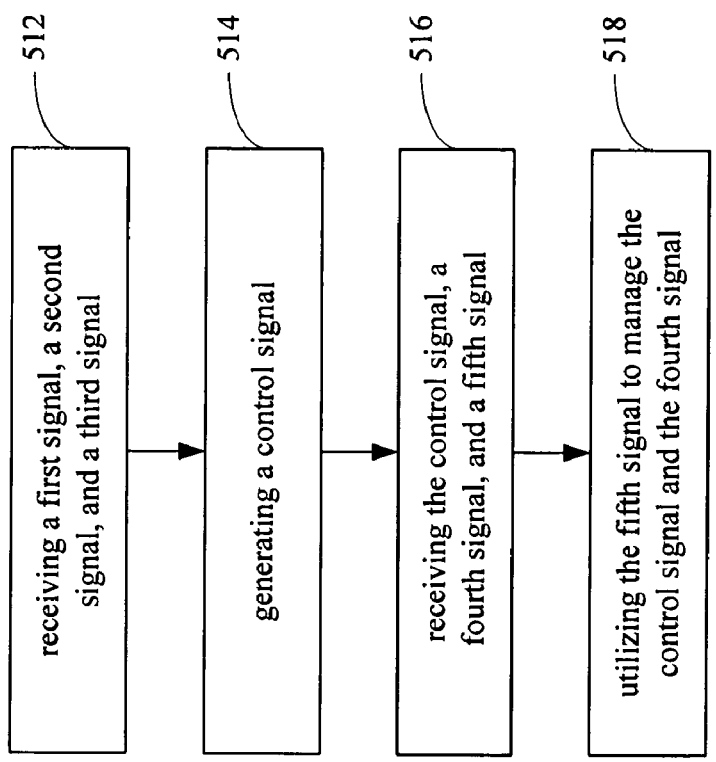
FIG. 5 illustrates a flow chart of one preferred embodiment in accordance with the present invention.

Referring to FIG. 5, a flow chart of a preferred embodiment in accordance with the present invention is illustrated. In step 512, receiving a first signal, a second signal, and a third signal. Wherein the first signal and the second signal are previous stage signals of the third signal, individually, and the third signal is used to enable a transmitting module to transmit data. However, the first signal and the second signal could be respectively the previous two-stage and the previous stage signals of the third signal. As for the previous stage signal, it means the input signal of a first logic part to the input signal of a second logic part whose input electronically connects to the output of the first logic part. Similarly, the previous two-stage signal means the input signal of the first logic part to the input signal of a third logic part, herein the output of the first logic part electronically connects to the input of the second logic part, and the output of the second logic part electronically connects to the input of the third logic part.

In step 514, generating a control signal, wherein the control signal is generated by the logic operation of the first signal, the second signal, and the third signal. The control signal is utilized to turn on the power of the transmitting module prior to the transmitting module sending data. In the present embodiment, the logic operation includes a NOR logic operation, but not limit to.

In step 516, receiving the control signal, a fourth signal, and a fifth signal, wherein the fourth signal is an original control signal that indicates whether to activate the transmitting module.

In step 518, utilizing the fifth signal to select one of the control signal and the fourth signal, so as to control the time for turning on the power of the transmitting module, and to solve the problem occurring in a handshaking process, and to provide a selection for changing control signals. In the present embodiment, the fifth signal is inputted to the selection line of a multiplexer, so as to select the fourth signal and the control signal in accordance with the present invention for changing control signals.

Although specific embodiments have been illustrated and described, it will be obvious to those skilled in the art that various modifications may be made without departing from what is intended to be limited solely by the appended claims.

What is claimed is:

1. A USB control circuit for saving power, said USB control circuit comprising:
    a first logic circuit, receiving a first signal, a second signal and a third signal, and generating a control signal that indicates whether to activate a transmitting module in a USB device, wherein said third signal enables the transmitting module in said USB device to transmit data; and
    a second logic circuit, receiving said control signal, a fourth signal and a fifth signal, and providing a selection for changing said control signal by said fifth signal.

2. The USB control circuit according to claim 1, wherein said first logic circuit comprises a NOR gate.

3. The USB control circuit according to claim 2, further comprising:
    a first sub-circuit, receiving said first signal and generating a first sub-signal as an input of said NOR gate, wherein said first sub-signal and said first signal have the same frequency but different phases; and
    a second sub-circuit, receiving said second signal and generating a second sub-signal as another input of said NOR gate, wherein said second sub-signal and said second signal have the same frequency but different phases.

4. The USB control circuit according to claim 3, wherein said first sub-circuit comprises a first D type flip-flop, and said second sub-circuit comprises a second D type flip-flop.

5. The USB control circuit according to claim 1, wherein said first signal and said second signal are previous stage signal of said third signal.

6. The USB control circuit according to claim 1, wherein said first signal is the previous two-stage signal of said third signal and said second signal is the previous stage signal of said third signal.

7. The USB control circuit according to claim 1, wherein said second logic circuit comprises a multiplexer, said multiplexer employs said fifth signal as its switch control.

8. The USB control circuit according to claim 7, further comprising:
    an OR gate, receiving said fourth signal and a seventh signal, and generating an input of said multiplexer; and
    an AND gate, receiving said fifth signal and a eighth signal, and generating a selection signal of said multiplexer; whereby the output of said multiplexer could be either said fourth signal or said control signal through said selection signal.

9. The USB control circuit according to claim 1, wherein said fourth signal is an original control signal that indicates whether to activate the transmitting module in said USB device.

10. The USB control circuit according to claim 1, wherein said fifth signal indicates a handshaking process being finished.

11. A USB control circuit for saving power, said USB control circuit comprising:
    a first logic circuit, receiving a first signal, a second signal and a third signal, and generating a control signal that indicates whether to activate a transmitting module in a USB device, wherein said third signal enables the transmitting module in said USB device to transmit data; and
    a multiplexer, receiving said control signal, a fourth signal and a fifth signal, wherein said multiplexer employs said fifth signal as its switch control to select said control signal or said fourth signal.

12. The USB control circuit according to claim 11, wherein said first logic circuit comprises a NOR gate.

13. The USB control circuit according to claim 12, further comprising:
    a first sub-circuit, receiving said first signal and generating a first sub-signal as an input of said NOR gate, wherein said first sub-signal and said first signal have the same frequency but different phases; and
    a second sub-circuit, receiving said second signal and generating a second sub-signal as another input of said NOR gate, wherein said second sub-signal and said second signal have the same frequency but different phases.

14. The USB control circuit according to claim 13, wherein said first sub-circuit comprises a first D type flip-flop, and said second sub-circuit comprises a second D type flip-flop.

15. The USB control circuit according to claim 11, wherein said first signal and said second signal are previous stage signal of said third signal.

16. The USB control circuit according to claim 11, wherein said fourth signal is an original control signal that indicates whether to activate the transmitting module in said USB device.

17. The USB control circuit according to claim 11, wherein said fifth signal indicates a handshaking process being finished.

18. A USB control method for saving power, said USB control method comprising:
    receiving a first signal, a second signal, and a third signal, wherein said first signal and said second signal are individually previous stage signals of said third signal, and said third signal is used to enable a transmitting module to transmit data; and
    generating a control signal, wherein said control signal is generated by a logic operation of said first signal, said second signal, and said third signal, said control signal is utilized to turn on the power of said transmitting module prior to said transmitting module sending data.

19. The USB control method according to claim 18, wherein said first signal is the previous two-stage signal of said third signal, said second signal is the previous stage signal of said third signal.

20. The USB control method according to claim 18, further comprising:
    receiving said control signal, a fourth signal, and a fifth signal, wherein said fourth signal is an original control signal that indicates whether to activate the transmitting module; and
    utilizing said fifth signal to select one of said control signal and said fourth signal to provide a selection for changing control signals.

* * * * *

UNITED STATES PATENT AND TRADEMARK OFFICE
CERTIFICATE OF CORRECTION

PATENT NO.        : 7,447,930 B2
APPLICATION NO.  : 11/220554
DATED             : November 4, 2008
INVENTOR(S)       : Yeh It is certified that error appears in the above-identified patent and that said Letters Patent is hereby corrected as shown below:

In column 1, lines 7-16: should read,

This application is a continuation-in-part of International application number PCT/US03/12682 filed April 23, 2003 which is a continuation-in-part of U.S. patent application serial number 10/382,334 filed Mar. 5, 2003.

Signed and Sealed this

Fourteenth Day of December, 2010

David J. Kappos
*Director of the United States Patent and Trademark Office*